United States Patent [19]

Foote

[11] Patent Number: 5,078,650
[45] Date of Patent: Jan. 7, 1992

[54] UNIVERSAL JOINT ARRANGEMENT FOR DOWNHOLE TOOLS

[75] Inventor: Dean Foote, Edmonton, Canada

[73] Assignee: Computalog Ltd., Edmonton, Canada

[21] Appl. No.: 508,973

[22] Filed: Apr. 13, 1990

[30] Foreign Application Priority Data

Apr. 14, 1989 [CA] Canada .................. 596696

[51] Int. Cl.⁵ ............................................. F16D 3/04
[52] U.S. Cl. ................................. 464/104; 464/147; 418/48
[58] Field of Search ............... 464/106, 104, 102, 147, 464/149, 157; 403/57, 80, 73; 175/320; 418/48

[56] References Cited

U.S. PATENT DOCUMENTS

| | | | |
|---|---|---|---|
| 1,298,680 | 4/1919 | Dunham | 464/149 X |
| 1,314,601 | 9/1919 | McCaskey | 464/174 X |
| 1,579,967 | 4/1926 | Sweney | 464/149 X |
| 1,861,884 | 6/1932 | Saives | 464/102 X |
| 2,433,791 | 12/1947 | Smith | 464/104 X |
| 2,551,735 | 5/1951 | Goff | 464/149 |
| 2,743,592 | 5/1956 | Nagy | 464/149 |
| 2,830,445 | 4/1958 | Kressin | 464/157 X |
| 3,485,062 | 12/1969 | Blake | 464/149 X |
| 4,331,003 | 5/1982 | Peterson | 464/149 X |
| 4,391,547 | 7/1983 | Jackson, Jr. et al. | 464/157 X |
| 4,599,056 | 7/1986 | Crase | 464/102 X |

Primary Examiner—Daniel P. Stodola
Assistant Examiner—Tony A. Gayoso
Attorney, Agent, or Firm—Robert W. Becker & Associates

[57] ABSTRACT

The universal joint arrangement includes a first adapter having two projecting support formations; a drive plate having a first pair of matching depressions or pockets is seated with these depressions on the projecting support formations of the first adapter and the drive plate has a second pair of pockets for the projecting support formations of a respective second adapter.

4 Claims, 5 Drawing Sheets

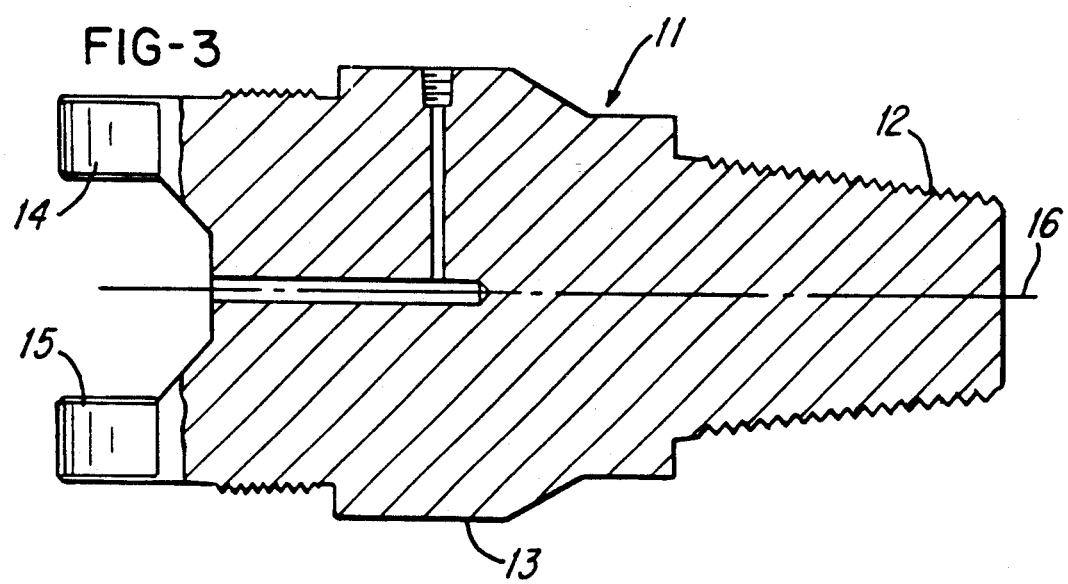
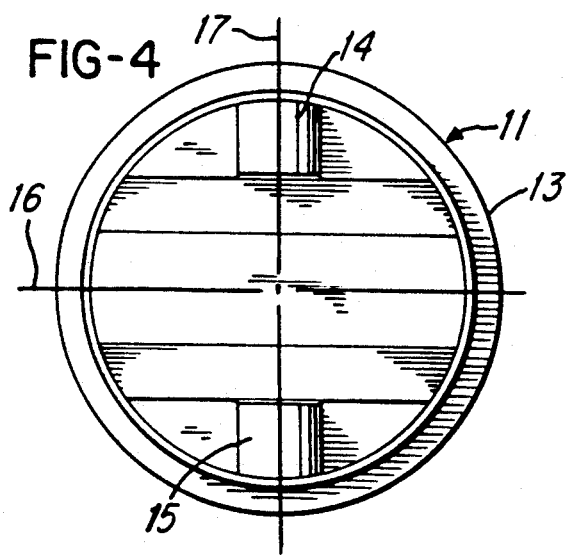
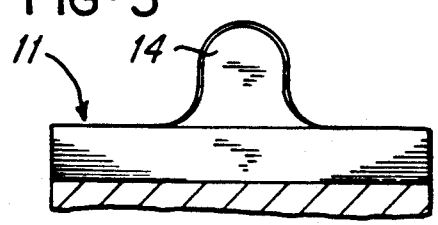
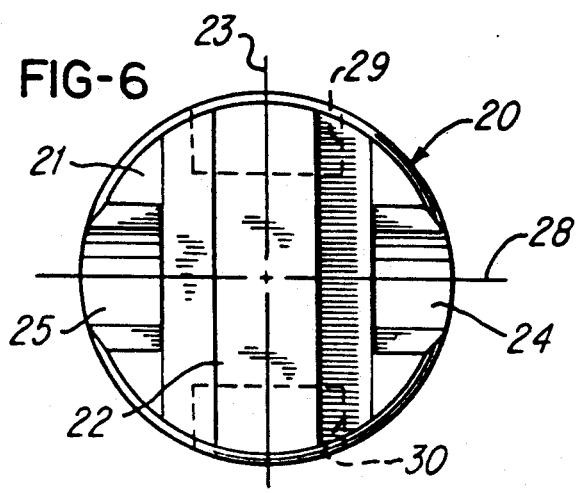
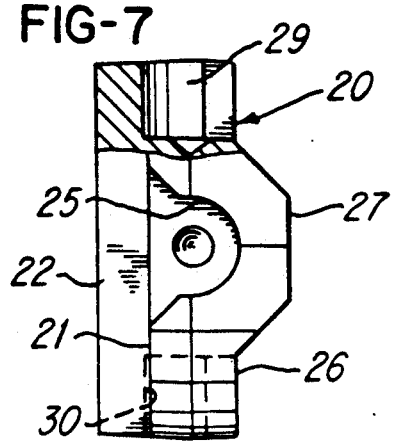

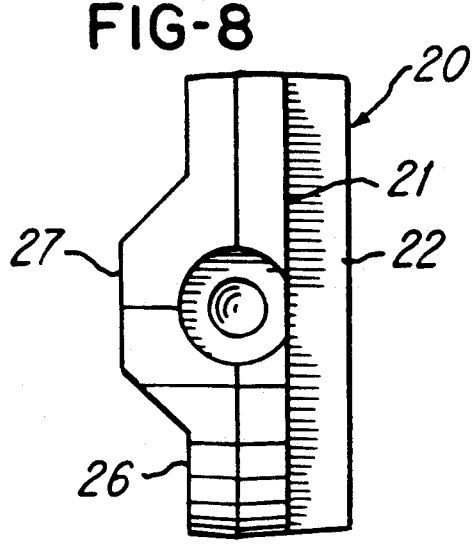
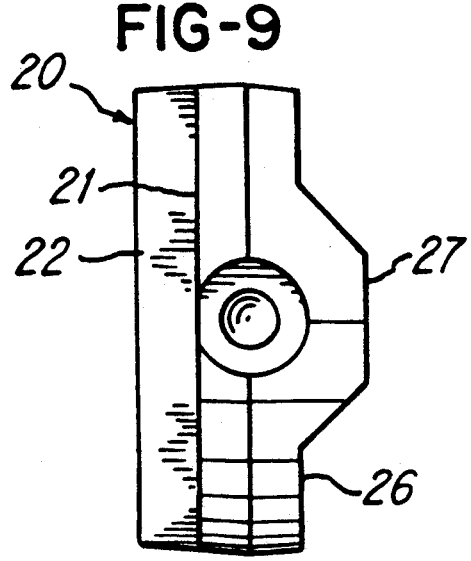
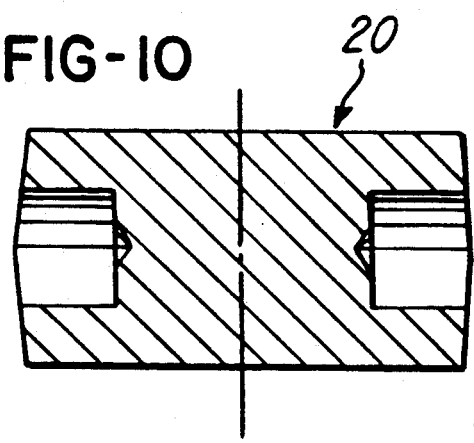

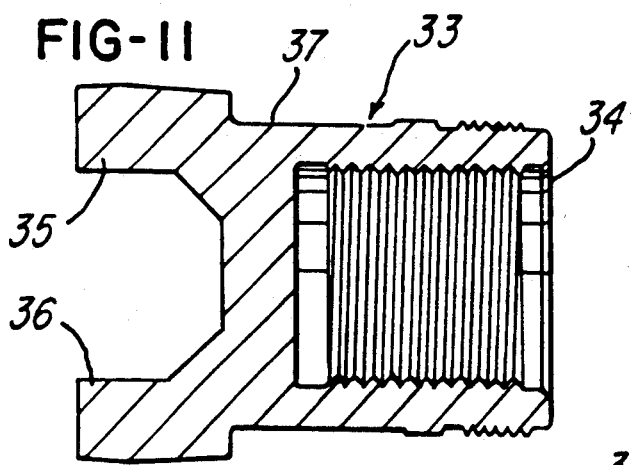
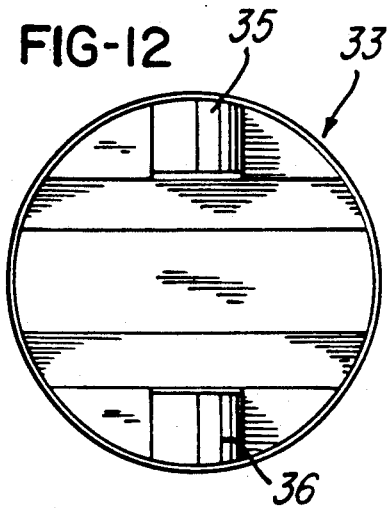
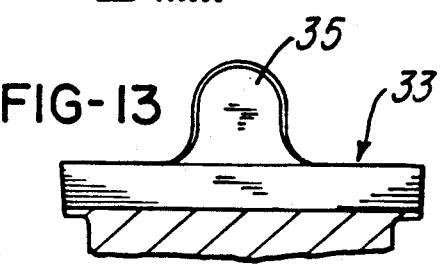
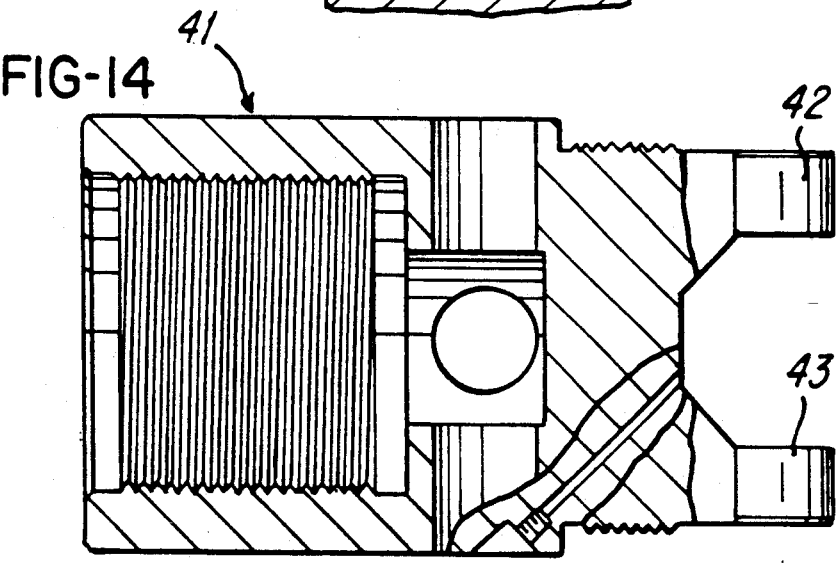
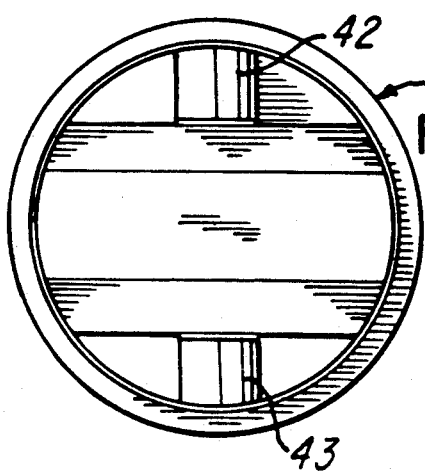
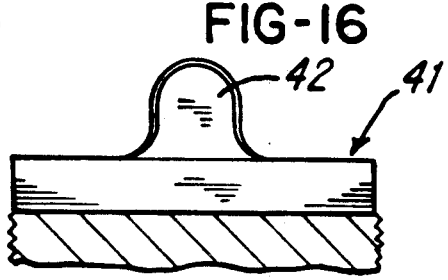

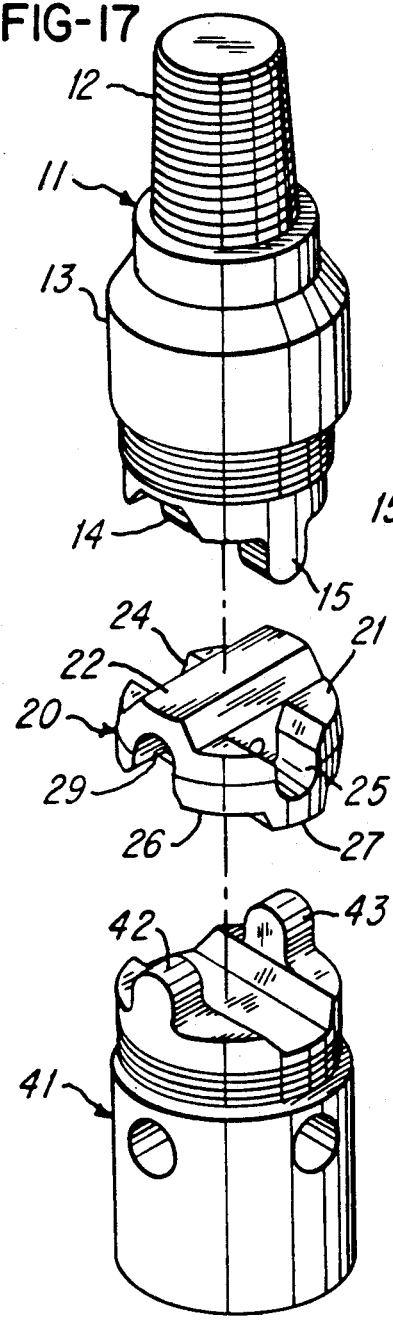
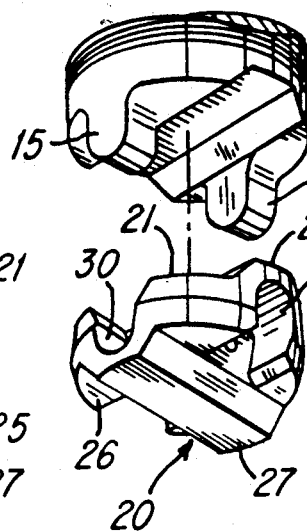
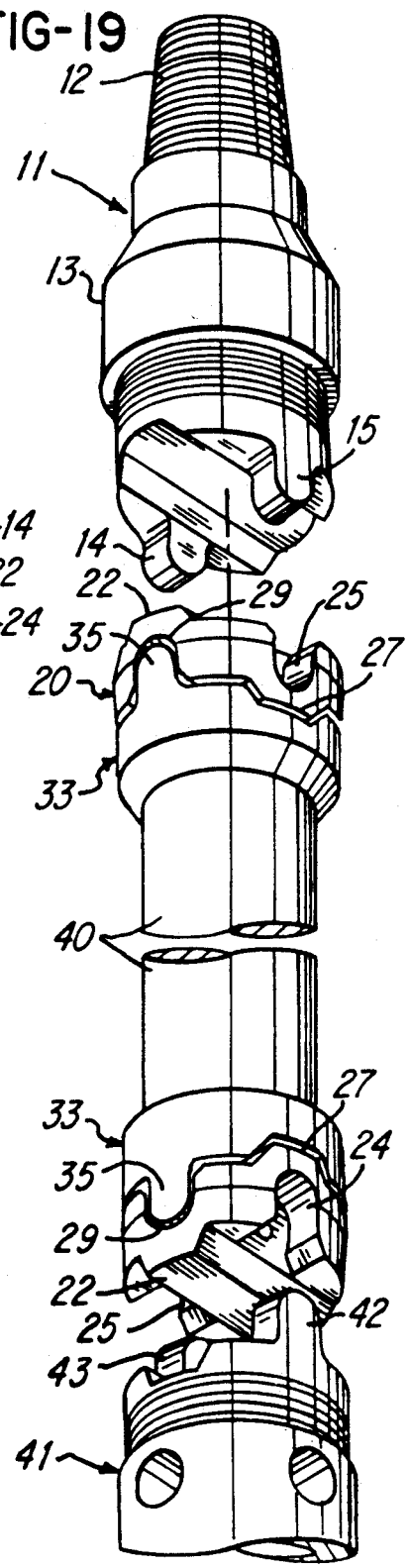
FIG-17
FIG-18
FIG-19

UNIVERSAL JOINT ARRANGEMENT FOR DOWNHOLE TOOLS

BACKGROUND OF THE INVENTION

1. Field of the Invention

This invention relates to a universal joint arrangement or similar power transmission means in downhole tools for oil well equipment, such as a downhole drilling motor.

More particularly, the invention is concerned with the universal joint arrangement for a downhole motor, such as a progressive cavity hydraulic motor positioned near the bottom end of a drill string to drive a drill bit or drill bits during drilling for oil and other like resources, and in which an eccentric rotating motion needs to be converted into a concentric or linear motion.

2. Description of the Prior Art

It has hitherto been proposed in Dunham U.S. Pat. No. 1,298,680 dated Apr. 1, 1919 to provide a flexible coupling comprising male units, a rib provided at each end of each unit, female units provided with a groove in each end thereof, with the ribs of the male units being adapted to be received in the grooves in the female units and the ribs further being adapted to interlock with one another in the female units.

McKashey U.S. Pat. No. 1,314,601 dated Sept. 2, 1919 shows a flexible shaft comprising a plurality of units, with each unit comprising a body part having at one end diametrically opposite bearing notches as well as at its other end longitudinally extending, diametrically opposite bearing lugs arranged at right angles to the notches. The lugs are adapted to engage within the bearing notches of the adjoining unit in a manner permitting a flexible movement between the units, and integral means for operatively retaining the lugs within the bearing notches.

Sweney U.S. Pat. No. 1,579,967 dated Apr. 6, 1926 shows a flexible coupling having opposing coupling heads of a driving connection therebetween composed of a series of plates disposed face to face in interlocking engagement with each of the heads and each plate being loosely mounted for relative movement transversely to the axis of the heads.

Goff U.S. Pat. No. 2,551,735 dated May 8, 1951 shows a shaft coupling comprising heads or end members for attachment to the adjacent ends of respective shaft sections to be coupled and an interposed intermediate member, with the end and intermediate members having interengaging ribs and grooves of which those at the opposite side of the intermediate member, respectively, are disposed transverse to one another. The ribs and grooves are in the form of gear teeth having rolling contact with engaging surfaces only at their lateral faces and clearances between the outer ends of the ribs and the bottoms of the grooves.

Nagy U.S. Pat. No. 2,743,592 dated May 1, 1956 discloses a flexible shaft coupling comprising a pair of corresponding end coupling sections and an intermediate coupling section, with the coupling being adapted to be disposed between adjacent ends of shafts to be coupled. The coupling has means provided in the end coupling sections for securing the adjacent shaft ends thereto, with the end coupling sections having adjacently disposed faces provided with corresponding lugs. The lugs are segment shaped, and the lugs of each end section are circumferentially-spaced relatively to one another. The intermediate coupling section has end faces each provided with a number of circumferentially spaced segment shaped lugs corresponding to the number of lugs of each end coupling section. The intermediate coupling section is interposed between the end coupling sections and the lugs of the intermediate coupling section interfitting between the lugs of the end coupling sections so that the coupling sections will be caused to rotate as a unit.

Kressin U.S. Pat. No. 2,830,445 dated Apr. 15, 1958 shows a flexible coupling wherein a pair of resilient coupling elements is mounted respectively on the ends of adjacent separable shafts and serves to transmit a torque load therebetween. The elements have identical opposed circular faces disposed generally at right angles to the respective shafts. A resilient interlock is provided on the opposed faces of the coupling elements and this comprises concentrically spaced flanges on one of the faces and aligned with similar flanges on the other of the faces, as well as a plurality of radially disposed teeth connecting the spaced flanges on the respective faces and extending axially beyond the flanges. The teeth are angularly spaced and together with the flanges form pockets therebetween for receiving the teeth of the opposed faces, thereby minimizing the radial deflection of the teeth due to the centrifugal forces developed in service.

Blake U.S. Pat. No. 3,485,062 dated Dec. 23, 1969 relates to a flexible coupling connecting two end-to-end shafts and comprising two hubs keyed to the shafts. An intermediate spool between the hubs has a series of axially and radially opening notches forming jaws on the ends of the spool, outwardly projecting jaws on the remote ends of the sleeves forming the hub bodies intermeshing loosely with the spool jaws, and a one-piece rubber spider at each end of the spool comprising cushioning pads between the working faces of the jaws, connecting webs between the spool jaws and the hub sleeves, and additional connecting webs between the hub jaws and the end walls of the notches. In the preferred mounting, the hub bodies are entirely within the spool, but each hub is reversible to increase the effective length of the coupling.

Peterson U.S. Pat. No. 4,S31,003 dated May 25, 1982 discloses a coupling of the "Tracta" joint type, comprising a driving member rotatable about a first axis, a driven member rotatable about a second axis, and two intermediate members for operatively coupling the driving member to the driven member. This reference discloses elastomeric bearing means disposed between and engaging each set of mutually opposing bearing surfaces of the driving, driven and intermediate members under the compression when torque is applied to the driving member about the first axis.

Jackson et al U.S. Pat. No. 4,391,547 dated July 5, 1983 is concerned with an improved quick release coupling assembly for a drive shaft of a downhole motor. The quick release coupling has an internally tapered collar to cause the mating taper on the outside surfaces of the clutch dogs to be held firmly by the collar and in intimate engaging relationship between the mating tapered surface. The angle of the mating tapered surfaces is greater than a self-locking angle so that the quick release feature permits easy disassembly of the joint, and thus the tool, on the rig floor as well as in the shop.

However, there has remained the need to provide means for a more effective and more simple manner to convert an eccentric rotating motion into a concentric or linear motion in a progressive cavity hydraulic type drilling motor.

SUMMARY OF THE INVENTION

In accordance with one object of the present invention there is provided a joint arrangement for converting an undulating or eccentric rotating motion of a progressive cavity hydraulic type motor into a concentric or straight-like motion of the shaft of the motor. The arrangement includes a first adapter having two projecting support formations; a drive plate having a first pair of pockets adapted for matingly receiving the projecting support formations of the first adapter and the drive plate having a second pair of pockets for matingly receiving the projecting support formations of a respective second adapter; and a second adapter, said second adapter having two projecting support formations which are offset by 90° with respect to the projecting support formations of said first adapter.

In accordance with another object of the invention there is also provided an assembly for a downhole drilling motor including a rotor adapter having a conical end for attached thereof to a respective motor shaft, a cylindrical body portion and two projecting support formations at said cylindrical body portion. The support projections are positioned forwardly at said body portion near the circumference of the cylindrical body portion and symmetrically with respect to the longitudinal axis of said rotor adapter; a first drive plate has a first pair of pockets adapted to matingly receive the projecting support formations of the said rotor adapter; a drive plate has a second pair of pockets for matingly receiving the projecting support formations of a respective first drive shaft adapter. The drive plate has a substantially circular configuration when considered in top plan view and is generally disc-shaped when considered in elevation. The first face of the drive plate includes reinforcement by way of a raised rib which extends symmetrically with respect to the transverse central axis of said drive plate when considered in plan view and off-set by 90° with respect to said rib extends said first pair of pockets which are milled into said first face and have a configuration so as to be adapted to respectively receive the projecting formations of said rotor adapter. The second face of said drive plate includes a reinforcement by way of a raised rib which extends symmetrically with respect to the longitudinal central axis of said drive plate and off-set by 90° with respect to said rib on said second surface extends said second pair of pockets which are milled into said first face and have a configuration so as to be adapted to respectively receive the projecting formations of said first drive shaft adapter; a first drive shaft adapter includes a body section and projecting formations adapted to operatively engage said second pair of pockets of said first drive plate. The first drive shaft adapter has a female threaded-receiving end for connecting a respective end at a respective drive shaft adapter; a drive shaft is connected at said first shaft adapter with one end and at a respective second drive shaft adapter with its other end; a second drive shaft adapter of substantially the same configuration as said first drive shaft adapter and is connected via threads at the other end of said drive shaft; a second drive plate of substantially the same configuration as said first drive plate is operatively connected between said second drive shaft adapter and a respective piston mandrel adapter; and a piston mandrel adapter has projecting support formations adapted to operatively engage the second pair of pockets of said second drive plate.

BRIEF DESCRIPTION OF THE DRAWINGS

This and other objects and advantages of the invention will become more readily apparent from the following detailed description taken in conjunction with the accompanying drawings in which:

FIGS. 3, 4 and 5 show details of the rotor adapter;

FIGS. 6, 7, 8, 9 and 10 show details of the drive plate;

FIGS. 11, 12 and 13 show details of the drive shaft adapter;

FIGS. 14, 15 and 16 show details of a piston mandrel adapter; and

FIGS. 17, 18 and 19 are perspective views of the arrangement of the parts at the drive plates.

DETAILED DESCRIPTION

Figure 1:
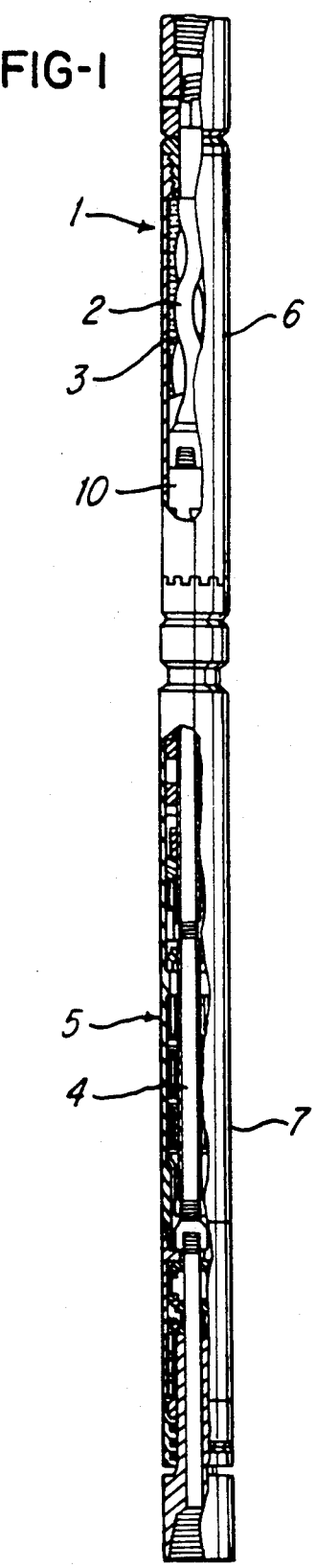
FIG. 1 is a diagrammatic view showing generally the arrangement of the MOYNO motor in a downhole motor.

FIG. 1 shows the general arrangement of a section of a known downhole motor, with a motor 1 which includes a helical shaft 2 to impart pressure to a drilling fluid generally identified by reference numeral 3.

The drilling fluid is passed through the central pipe 4 and thence to the drill elements, not shown, in a customary manner.

The speed reducer section of the assembly is generally designated by the reference numeral 5, and associated housing elements are identified by reference numerals 6 and 7.

The helical shaft 2 includes a female threaded-receiving end 10 in which a rotor adapter 11 is threadingly connected. The rotor adapter 11 is shown in greater detail in FIGS. 3, 4 and 5.

The rotor adapter 11 includes an externally threaded conical end 12, a cylindrical body portion 13, and a pair of support formations or projections 14 and 15 forwardly at said body portion 13. The projections 14 and 15 are positioned near the circumference of the cylindrical body portion and symmetrically with respect to the longitudinal axis 16 of the rotor adapter 11, as well as the transverse axis 17. The projections are rounded as can best be seen in FIG. 5 and present generally a clevis configuration as is clear from FIG. 3.

A first drive plate 20 is positioned at the rotor adapter 11 and it interfaces with a drive shaft adapter 33, the latter to be described in greater detail below.

With reference to FIGS. 6, 7, 8, 9 and 10, the drive plate 20 is generally circular when considered in the top plan view of FIG. 6 and generally disc-shaped when considered in the elevational views according to FIGS. 7, 8, 9 and 10. However, the first face or surface 21 of drive plate 20 includes a reinforcement or raised rib 22 which extends symmetrically with respect to the transverse central axis 23. Extending off-set by 90° with respect to this rib 22 there are provided pockets 24 and 25 which are milled or otherwise formed into the first face or surface 21 so as to be adapted to respectively receive the projecting formations 14 and 15 of the rotor adapter 11.

The opposite or second face 26 of the drive plate 20 includes a reinforcement or raised rib 27 which extends symmetrically with respect to the longitudinal central axis 28. The second face 26 has pockets 29 and 30 which are generally identical in configuration to pockets 24 and 25, but being off-set by 90° with respect to the first pair of pockets 24 and 25, as can be seen in FIG. 6.

The pockets 29 and 30 serve to receive support formations or projections 35 and 36 of the drive shaft adapter 33 shown in greater detail in FIGS. 11, 12 and 13. The drive shaft adapter 33 further includes a female threaded receiving end 34 and support formations or projections 35 and 36 extending from the body section 37.

The projections 35 and 36 are of the same configuration as the projections 14 and 15 of the rotor adapter 11.

Figure 2:
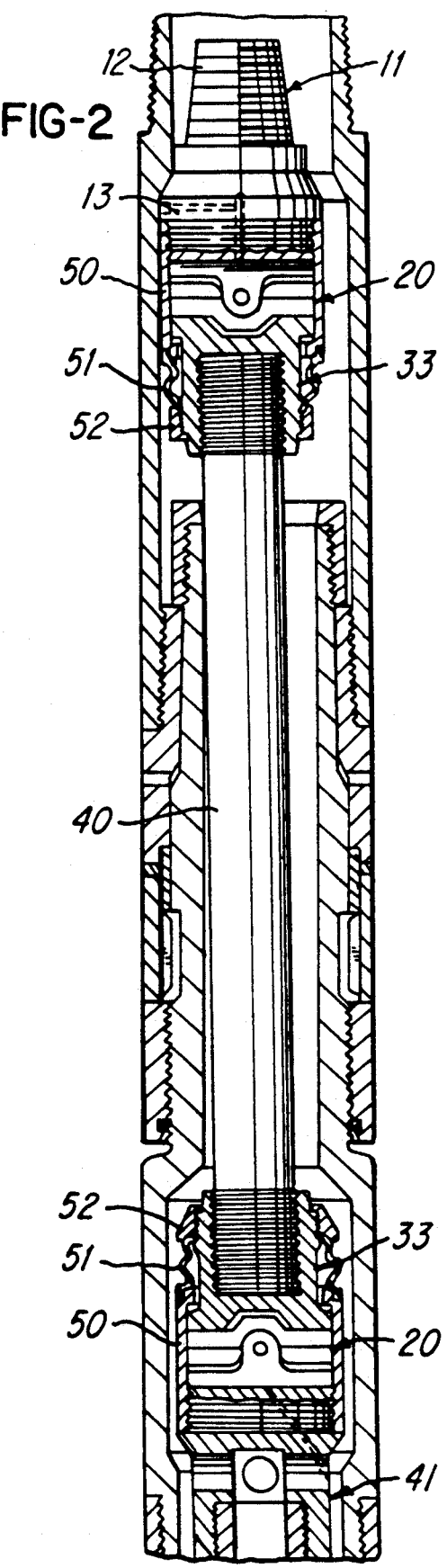
FIG. 2 is a partial view in section of the universal joint arrangement according to the present invention.

The receiving end 34 of the drive shaft adapter 33 serves to threadingly connect a rod or drive shaft 40 with its first end (FIG. 2).

At the opposite end of shaft 40 there is secured a further drive shaft adapter 33 which cooperates with a second drive plate 20. The second drive plate 20 is associated with a piston mandrel adapter 41 (FIGS. 14 to 16) which has projections 42 and 43 respectively adapted to fit cooperatively into the pockets 29 and 30 of the second drive plate 20.

The interface locations at the drive plates 20 are enclosed by sleeves 50 and bellows-type seals 51 which, in turn, are secured by fastening rings 52.

By way of the described assembly, the eccentric or undulating rotating motion of the helical shaft 2 is translated into the concentric or straight-line motion of the respective attachment element in the motor. The helical shaft 2 can then cause displacement of drilling fluid 3 from the upper terminus to the lower or drill bit terminus of the downhole motor as is known in the art and need not be described in greater detail here.

Thus, the described arrangement as shown in FIG. 2 includes two U-joints which are generally of identical configuration and perform the conversion action of an eccentric or undulating motion to a straight-line motion of drive shaft 40.

The machined surface of the various pockets (24 and 25, 29 and 30) and projecting formations (14 and 15, 35 and 36, 42 and 43) interact with a clearance to prevent any lateral or side motion, typically with a clearance in a range of from about 0.05 to 0.25 mm.

The assembly of the present invention provides for a very simple and substantially maintenance-free structure.

Furthermore, no fully spherical elements are required for absorbing the thrust and torque, as previously customary. Also, connector pins are eliminated.

It will be understood that the embodiments illustrated in the aforesaid are primarily used for describing the present invention, but not as limiting as the present invention. Any structure or apparatus made with or without minor modifications but not deviating from the spirit, concept and features of the present invention is deemed as being included in the scope of the claims herewith.

I claim:

1. A universal joint arrangement for converting an eccentric rotating motion of a downhole drilling motor into a concentric motion, said arrangement comprising:
   a first adapter having two projecting support formations;
   a second adapter having two projecting support formations that are offset by 90° with respect to said projecting support formations of said first adapter; and
   a drive plate that is interposed between said first and second adapters, with said drive plate being substantially circular when considered in a top plan view and generally disc-shaped when considered in elevation, said drive plate having a first face that is provided with a reinforcement in the form of a first raised rib that extends symmetrically relative to a transverse central axis of said drive plate when considered in a plan view, with said first face of said drive plate also being provided with a first pair of pockets that is offset by 90° relative to said first raised rib, with said first pair of pockets matingly receiving said projecting support formations of said first adapter, said drive plate also having a second face that is provided with a reinforcement in the form of a second raised rib that extends at right angles relative to said first raised rib of said first face of said drive plate, with said second face also being provided with a second pair of pockets that is offset by 90° relative to said second raised rib, with said second pair of pockets matingly receiving said projecting support formations of said second adapter.

2. The universal joint arrangement according to claim 1, wherein said drive plate is supported between said first and second adapters to provide sufficient clearance to allow deflection, angular movements, as well as absorption of the undulating motion of said motor.

3. The universal joint arrangement according to claim 1, wherein said first adapter is a rotor adapter including a conical end for connecting said rotor adapter to the respective shaft of said motor, said rotor adapter having a cylindrical body portion, said support projections being disposed on said body portion near the circumference of the cylindrical body portion and symmetrically with respect to the longitudinal axis of said rotor adapter.

4. The universal joint arrangement of claim 1, wherein respective projecting formations are arranged in respective pockets with a between faces of said parts in a range of from about 0.05 to 0.25 mm.

* * * * *